(No Model.)

H. DUFFEY.
Oscillating Vehicle Gear.

No. 243,436.  Patented June 28, 1881.

Witnesses:  
W. B. Masson  
Alex. Scott

Inventor  
Hugh Duffey  
by Luggett & Nottingham  
attorney

UNITED STATES PATENT OFFICE.

HUGH DUFFEY, OF CORTLAND, NEW YORK.

OSCILLATING VEHICLE-GEAR.

SPECIFICATION forming part of Letters Patent No. 243,436, dated June 28, 1881.

Application filed March 31, 1881. (No model.)

*To all whom it may concern:*

Be it known that I, HUGH DUFFEY, a citizen of the United States, residing at Cortland, in the county of Cortland and State of New York, have invented certain new and useful Improvements in Oscillating Vehicle-Gears; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object and purpose of my improvements are to prevent the straining and wrenching of the body of a vehicle having an oscillating gear as heretofore made, and to produce an easy-riding wagon.

My invention consists, in part, in making the oscillator above the fifth-wheel, and in regulating its action by means of springs between the body and the fifth-wheel, as herein shown; and my invention further consists in the novel and useful arrangement and combination of the parts of the oscillator and gear of the vehicle.

Figure 1:
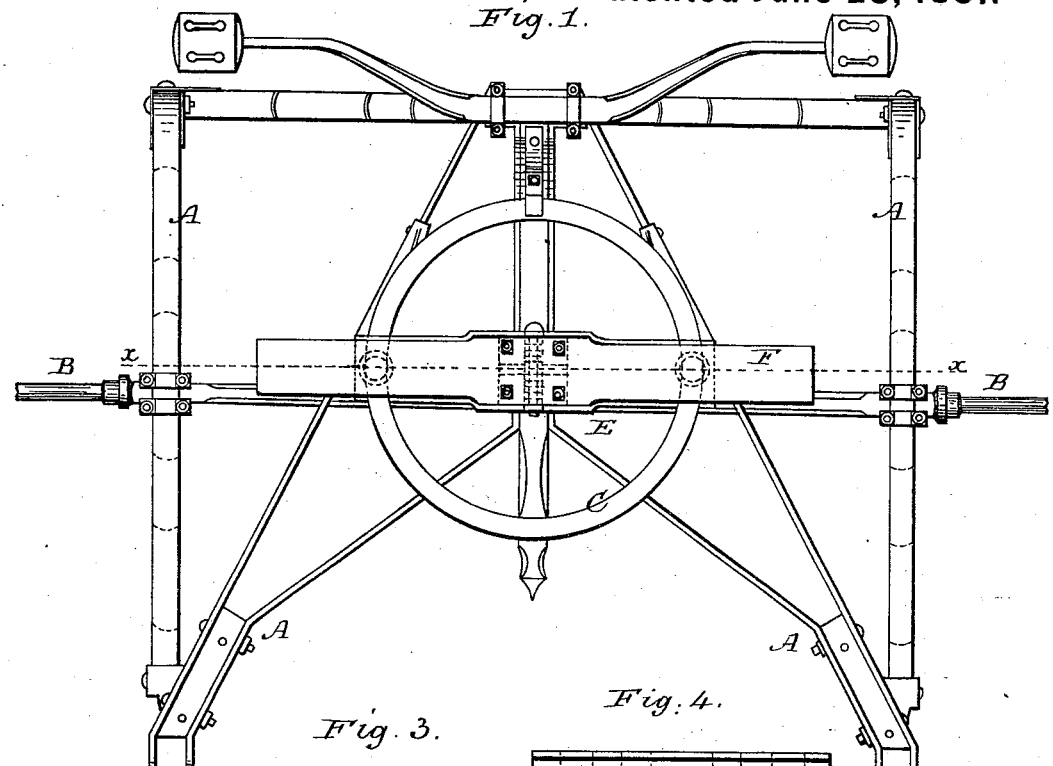
Figures 3, 4:
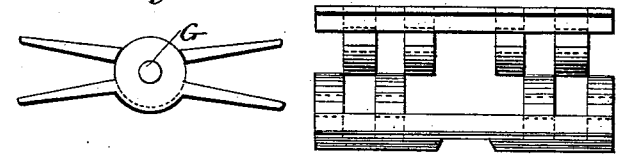
Figure 2:
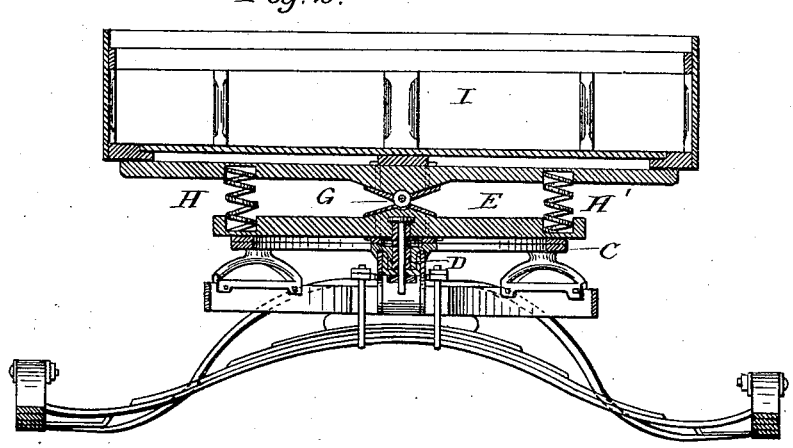

In the drawings, Figure 1 is a plan view of the front gear with the oscillator. Fig. 2 is a sectional elevation of part of the gear, showing the oscillator and part of the body. Fig. 3 shows an end view of the oscillator-joint. Fig. 4 shows a side view of the oscillator-joint, showing its construction.

In the drawings the same letters on the several figures indicate like parts.

I will now proceed to describe the oscillator.

A A represent an ordinary platform spring wagon gear.

B represents the axle, and C represents the fifth-wheel, which is made in the ordinary way.

D represents the bolt which secures the wheel, being a king-bolt, placed as shown in Fig. 2.

E represents the piece to which the fifth-wheel is attached, and F represents the other piece attached to the body of vehicle.

G represents the oscillator-joint, which can be made in form shown in Fig. 4. This joint is made in a hinge form, and is securely fastened to the pieces E and F, as shown in Figs. 1 and 2.

H H' represent springs. These springs may be made in various ways. A flat piece of steel may be used, being attached to E and F.

I represents the body of the vehicle.

The operation of the oscillator must be evident, and it is apparent that the straining of the body and other parts of the wagon is overcome. The springs H and H' assist greatly in preventing and equalizing strains.

What I claim is—

1. In vehicle-gears, the oscillator composed of the bars E F, the springs H H', and hinge G, substantially as specified.

2. The combination and arrangement of the hinge-joint G, the pieces E and F, the fifth-wheel C, bolt D, and springs H H', all arranged, combined, and used substantially as and for the purposes specified and shown.

In testimony whereof I affix my signature in presence of two witnesses.

HUGH DUFFEY.

Witnesses:
M. STANLEY BIERCE,
JOHN W. SUGGETT.